United States Patent [19]

Murphy et al.

[11] Patent Number: 5,298,037
[45] Date of Patent: Mar. 29, 1994

[54] METAL HYDRIDES

[75] Inventors: Donald W. Murphy, Green Brook; Brijesh Vyas, Warren, both of N.J.

[73] Assignee: AT&T Bell Laboratories, Murray Hill, N.J.

[21] Appl. No.: 954,647

[22] Filed: Sep. 30, 1992

[51] Int. Cl.$^5$ .............................................. H01M 10/04
[52] U.S. Cl. .................................... 29/623.1; 429/59; 423/644
[58] Field of Search .................. 423/21.1, 23, 71, 115, 423/138, 155.04; 148/269, 274, 275; 29/623.1; 429/59

[56] References Cited

U.S. PATENT DOCUMENTS

| | | | |
|---|---|---|---|
| 3,378,344 | 4/1968 | Horn et al. | 423/644 X |
| 3,909,247 | 9/1975 | Paris et al. | 423/21.1 |
| 4,636,445 | 1/1987 | Yamano et al. | 429/59 X |
| 4,744,946 | 5/1988 | Sasai et al. | 423/644 X |

*Primary Examiner*—Stephen Kalafut
*Attorney, Agent, or Firm*—Bruce S. Schneider

[57] ABSTRACT

Metals useful in the formation of hydrides for applications such as batteries are advantageously activated by a low temperature low pressure process. This process which is useful at room temperature and atmospheric pressure involves treating the metal such as $LaNi_5$ with boron reducing agents such as $NaBH_4$.

11 Claims, No Drawings

METAL HYDRIDES

BACKGROUND OF THE INVENTION

1. Field of the Invention

This invention relates to metal hydrides and in particular to processes involving such hydrides.

2. Art Background

Metal hydrides are used in a variety of industrial applications. Although there are many such applications, possibly the most prominent is the use of metal hydrides in batteries. For example, secondary nickel-metal hydride batteries employ lanthanum nickel hydride (or alloy modifications) or other intermetallic hydrides in the negative electrode. A variety of other uses involving energy storage and transfer have been described. Irrespective of the application, a crucial step in preparation is activation of the intermetallic. Activation is achieved, for example, by repeatedly reducing the metal such as $LaNi_5$ to the corresponding hydride with $H_2$ gas at high pressure and/or temperature followed by removal of hydrogen at lower pressures.

This cyclic process, generally denominated activation, is believed to serve two purposes. Each reduction to the hydride 1) removes reducible surface oxides which tend to interfere with the functioning of the material in the ultimate desired application, and 2) a reduction in particle size resulting from an increase in volume that causes fracture of the metal particles. Thus, activation, it is believed, removes oxide and produces in the hydride a greater surface area than was present in the corresponding metal. Both the removal of the oxide and the increase in surface area enhances the operation of the material for applications such as batteries where a surface oxide and a low surface area reduce the rate of the hydriding reactions.

Activation of hydrides has typically been performed at relatively high pressures (up to 1000 psi) and temperatures as high as 450° C., by subjecting the metal directly to hydrogen gas. Clearly, although such conditions are not prohibitive to commercial use, they require relatively large expenditures for suitable equipment. Thus, an alternative to high pressure reaction of hydrogen gas with the corresponding metal would be quite desirable.

SUMMARY OF THE INVENTION

Activation of metals such as $LaNi_5$ are accomplished even at room temperature and atmospheric pressure by reaction of the metal with a hydriding agent represented by the formula:

$$BH_3 \cdot Z$$

or $$A^+(BR_{3-n}H_{n+1})^-$$

where $A^+$ is a cation such as $Na^+$, $K^+$, $Me_4N^+$; B is the element boron, R is hydrogen or an organic substituent such as an alkoxide, e.g. methoxy, or an amide moiety, and Z is a Lewis base such as an amine moiety. For use of materials such as $NaBH_4$ the reagent is advantageously dissolved in a basic aqueous medium similar to the electrolyte used in nickel metal hydride batteries. Addition of the hydriding agent to a hydridable metal results in formation of the corresponding metal hydride. The resulting metal hydride is generally of much smaller particle size than the starting metal. The metal hydride or the dehydrided metal is advantageously employed in a variety of applications such as in a nickel/metal hydride battery.

DETAILED DESCRIPTION

Metals capable of forming stable metal hydrides are converted into their corresponding hydride and are activated through the reaction of the metal with a boron compound. Typical metals including elements, alloys, and intermetallic materials are employed in such conversions. Examples of such metals are palladium, TiNi, $LaNi_{4.7}Al_{0.3}$, $LaNi_5$, $MmNi_{4.5}Al_{0.5}$, $Mg_2Cu$, $Mg_2Ni$, $MmNi_{3.5}Al_{0.8}Co_{0.7}$, and $CaNi_5$ (Mm stands for mischmetal, a mixture of rare earths). Basically, for the inventive procedure to be advantageous, a metal should be capable of forming a hydride with a hydrogen vapor pressure (at the reaction temperature) of approximately 10 atmospheres or less, and an effective chemical hydrogen diffusivity of at least $10^{-16}\,cm^2/sec$ at the reaction temperature (usually approximately 23° C.) A subset of such materials that are useful is the metals corresponding to hydrides that produce an electromotive force when employed in a nickel oxide/metal hydride battery.

Vapor pressures of metal hydrides are available in compendia such as E. L. Huston and E. D. Sandrock, *Journal of Less Common Metals*, 74, 435–443 (1980) or *Topics in Applied Physics*, 63, L. Schlapbach, ed., Springer-Verlag, Berlin, 1988. Chemical diffusion data is determined with sufficient accuracy in this context from information in *Topics in Applied Physics*, 67, L. Schlapbach, ed., Springer-Verlag, Berlin, 1992. Typically, self diffusion rates of hydrogen in metals have been measured. However, because the $M\text{-}MH_x$ system is generally two phases rather than a single phase with variable x, it is possible that the chemical diffusion rate will be enhanced by several orders of magnitude. Clearly if the self diffusion rate is greater than $10^{-16}\,cm^2/sec$ it satisfies the criterion. If the self diffusion rate is lower, it is possible to enhance the effective rate by the chemical driving force of the hydriding agent or by increasing the temperature.

The hydrides are formed by reaction of the corresponding metal with reducing agents of the form:

$$BH_3 \cdot Z$$

or $$A^+(BR_{3-n}H_{n+1})^-$$

where $A^+$ is not critical and is a counter ion, B is boron, Z is a Lewis base such as dimethylammine, R is an organic substituent, and n is 0 to 3. The particular organic substituent, R, employed is not critical and a variety of common moieties such as methoxide or amide are useful. The chosen reducing agent is employed generally in an aqueous solution, but it is possible to add other solvents such as ethanol. The solvent employed should not produce decomposition of, or reaction with, the reducing agent. Thus, for example, if an aqueous solution is employed, boron compounds such as $NaBH_4$ are preferably used when the pH is above approximately 12 to reduce hydrolysis. Thus, it has been found that $NaBH_4$ reacts with metals such as $LaNi_5$ in a 5% by weight to 40% by weight aqueous potassium hydroxide solution.

Additionally, the reaction rate for producing the hydride when an aqueous solution is employed, to an extent, is dependent on the pH of that solution. For $NaBH_4$ extensive hydrolysis of the borohydride itself (a competing side reaction) dominates for a pH less than approximately 12. Thus, for this reagent, a higher pH is preferred. Typically, at atmospheric pressure and room temperature, reaction times of several hours are required, with the rate dependent on metal particle size and diffusivity of hydrogen in the metals. Typical reaction times for particles in the range 100 $\mu$m to several millimeters are a few hours to several days. Generally, to accomplish such reactions, the metals are immersed in the reducing agent solution and extracted by filtration and washing with water as the hydride after reaction.

It is not necessary to isolate the hydride for the metal to become activated. The hydriding reaction leads to expansion of the metal resulting in fracture (an exception is Pd metal). Upon depletion of borohydride in the solution, hydrogen tends to be lost from the metal either because of the equilibrium hydrogen vapor pressure of the $M-H_x$ phase or through oxidation by, for example, oxygen in the ambient. The metal is still activated because of its reduced particle size as long as a substantial oxide is prevented from accumulating on the surface by expedients such as storing the metal in a nitrogen or argon atmosphere. In an exemplary embodiment, the particle size of $LaNi_{4.7}Al_{0.3}$ is reduced from less than 1.5 mm to less than 20–75 $\mu$m after reaction with $NaBH_4$. Hydrogen is lost at atmospheric pressure over a few hours after filtration. After 10 reaction cycles with $NaBH_4$, the size was more uniform at 20–30 $\mu$m. These values compare to 10–20 $\mu$m after 10 cycles with hydrogen gas at 10 atmospheres at room temperature.

Although the desired reactions occur at room temperature and atmospheric pressures, higher or lower temperatures and pressures are not precluded. Typically, temperatures in the range $-20°$ to $+50°$ C. are useful while hydrogen pressures in the range 0 to 100 atmospheres are also employable. It is possible that the metal before reduction has an extremely thick or non-permeable oxide coating which precludes reaction. For such materials a pretreatment with standard etchants that depend on the nature of the metal are useful to reduce the oxide coating and thus to correspondingly reduce the time required for activation. Iron containing hydrides also have a tendency to oxidize under the reaction conditions. Thus, conditions such as pH should be controlled to reduce this oxidation to an acceptable level.

The following Examples are illustrative of conditions useful in the invention.

EXAMPLE 1

A Pd foil (1.25 cm $\times$ 2.54 cm $\times$ 1 mil thick) was immersed in a solution of 5.0 g $NaBH_4$ and dissolved in 50 ml of a 5% KOH solution in water. After 20 hours, x-ray powder diffraction showed complete conversion to the $\beta$ $Pd-H_x$ phase with x greater than or approximately equal to 0.6.

EXAMPLE 2

Random pieces (smaller than 1.5 mm on edge) of $LaNi_{4.7}Al_{0.3}$ (1.0 g) used as received (Aldrich Hy-Stor #207) were treated with a solution of 5.0 g $NaBH_4$ in 50 ml of a 5% KOH solution as in Example 1. X-ray diffraction after filtering confirmed formation of the hydride phase $LaNi_{4.7}Al_{0.3}$ $H_x$ (x approximately equal to 5). Scanning electron micrographs (SEM) indicated that the particle size following reaction was 20–75 $\mu$m. X-ray diffraction after exposure to air for about 0.5 hours indicated oxidation back to $LaNi_{4.7}Al_{0.3}$. Rehydriding as in Example 1 with $NaBH_4$ followed by air oxidation was repeated 10 times after which SEM showed a size distribution of 20–30 $\mu$m.

EXAMPLE 3

The following intermetallics were treated as in Example 1 with $NaBH_4$, and hydride formation was confirmed by x-ray diffraction and particle sizes were reduced to less than 50 $\mu$m: $LaNi_5$, $MmNi_{4.5}Al_{0.5}$ (Mm=MischMetal or mixtures of rare earths), $CaNi_5$, $Mg_2Ni$, $Mg_2Cu$, $MmNi_{3.5}Al_{0.8}Co_{0.7}$, FeTi, $Fe_{0.9}Mn_{0.1}Ti$, $Ca_{0.7}Mm_{0.3}Ni_5$, TiNi, and $Fe_{0.8}Ni_{0.2}Ti$.

EXAMPLE 4

$LaNi_{4.7}Al_{0.3}$ alloy powder activated as in Example 2 was constructed into a battery electrode and cycled vs standard nickel electrodes in 30% KOH electrolyte. The activated powder (0.25 gms) was pressed into a pellet between two expanded nickel screens at approximately 5000 psi and a nickel tab was welded to the pellet. The resultant electrode of 1.26 cm$^2$ and 0.04 cm. thick was placed between two standard nickel electrodes, separated by non-woven nylon separators, and immersed in a solution of 30% KOH. The cell was charged at 25 mA for 5 hrs. and then discharged at 50 mA to a cutoff voltage of 1 V. A cell was also constructed with $LaNi_{4.7}Al_{0.3}$ alloy activated 10 times in $H_2$ gas at high pressure and cycled in a similar fashion. The delivered capacity for both the cells, constructed with the powders activated in the $NaBH_4$ solution and $H_2$ gas, was ~300 mAh/g on the first discharge, and then cycled in similar fashion, i.e. the capacity decays slowly delivering ~250 mAh/gm after 100 cycles.

EXAMPLE 5

Random pieces of as received $LaNi_{4.7}Al_{0.3}$ (1 gm each) were treated for 18 hrs. in solutions of 1M $BH_3\cdot NH(CH_3)_2$ in 1M NaOH. Powder x-ray diffraction after filtering from the solutions confirmed the formation of the hydride phase and optical microscopy indicated significant reduction in size of the particles.

We claim:

1. A process for activating a metal comprising the steps of subjecting said metal to a reagent comprising a material chosen from the group consisting of $BH_3\cdot Z$ and $A^+(BR_{3-n}H_{n+1})^-$ where $A^+$ is a cation, B is a boron, H is hydrogen, R is hydrogen or an organic substituent, Z is a Lewis base, and n is 0 to 3.

2. The process of claim 1 wherein said metal comprises an element, an alloy, or an intermetallic.

3. The process of claim 2 wherein said metal comprises palladium, TiNi, $LaNi_{4.7}Al_{0.3}$, $LaNi_5$, $MmNi_{4.5}Al_{0.5}$, $Mg_2Cu$, $Mg_2Ni$, $MmNi_{3.5}Al_{0.8}Co_{0.7}$ and $CaNi_5$.

4. The process of claim 3 wherein R comprises an amide or methoxy moiety.

5. The process of claim 1 wherein R comprises an amide or methoxy moiety.

6. The process of claim 1 wherein said process is performed with said reagent dissolved in a basic aqueous solution.

7. A process for fabricating a battery comprising the steps of forming a metal or metal hydride electrode and inserting said electrode in a battery wherein before said inserting said metal hydride electrode or said metal electrode is activated by cyclic hydrogenation and dehydrogenation including the treatment of said metal hydride after said dehydrogenation or treatment of said metal wherein said treatment comprises reaction with a reagent comprising a material chosen from the group consisting of $BH_3 \cdot Z$ and $A^+(BR_{3-n}H_{n+1})^-$, wherein $A^+$ is a cation, B is a boron, H is hydrogen, R is hydrogen or an organic substituent, Z is a Lewis base, and n is 0 to 3.

8. The process of claim 7 wherein said metal comprises an element, an alloy, or an intermetallic.

9. The process of claim 8 wherein said metal comprises TiNi, $LaNi_{4.7}Al_{0.3}$, $LaNi_5$, $MmNi_{4.5}Al_{0.5}$, $Mg_2Cu$, $Mg_2Ni$, $MmNi_{3.5}Al_{0.8}Co_{0.7}$ and $CaNi_5$.

10. The process of claim 9 wherein R comprises an amide or methoxy moiety.

11. The process of claim 7 wherein R comprises an amide or methoxy moiety.

* * * * *